US008793251B2

(12) United States Patent
Horne et al.

(10) Patent No.: US 8,793,251 B2
(45) Date of Patent: Jul. 29, 2014

(54) INPUT PARTITIONING AND MINIMIZATION FOR AUTOMATON IMPLEMENTATIONS OF CAPTURING GROUP REGULAR EXPRESSIONS

(75) Inventors: William G Horne, Lawrenceville, NJ (US); Prasad V Rao, Metuchen, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/562,728

(22) Filed: Jul. 31, 2012

(65) Prior Publication Data

US 2014/0040261 A1    Feb. 6, 2014

(51) Int. Cl.
*G06F 17/30*    (2006.01)

(52) U.S. Cl.
USPC .......................................... 707/737; 707/755

(58) Field of Classification Search
USPC .................................. 707/737, 755
See application file for complete search history.

(56) References Cited

U.S. PATENT DOCUMENTS

| | | | |
|---|---|---|---|
| 7,788,206 B2 | 8/2010 | McMillen et al. | |
| 8,051,085 B1 * | 11/2011 | Srinivasan et al. | 707/737 |
| 2008/0109431 A1 * | 5/2008 | Kori | 707/6 |
| 2010/0057736 A1 * | 3/2010 | Srinivasan et al. | 707/6 |
| 2010/0114811 A1 | 5/2010 | Lambov | |
| 2010/0192225 A1 | 7/2010 | Ma et al. | |
| 2011/0167030 A1 * | 7/2011 | Bremler-Barr et al. | 706/48 |
| 2011/0258210 A1 | 10/2011 | Agarwal et al. | |
| 2012/0072380 A1 | 3/2012 | Liu et al. | |

OTHER PUBLICATIONS

Ahmad, I. et al., Lang-Algorithm for Constructing Unique Input/Output Sequences in Finite-state Machines, (Research Paper), Proceeding IEEE Computers and Digital Techniques, Mar. 19, 2004, pp. 131-140, vol. 151, No. 2.

Kumar, S. et al., Algorithms to Accelerate Multiple Regular Expressions Matching for Deep Packet Inspection, (Research Paper). SIGCOMM 2006 Proceedings of the 2006 Conference on Applications, Technologies, Architectures, and Protocols for Computer Communications, Sep. 12-15, 2006, pp. 339-350.

* cited by examiner

*Primary Examiner* — Khanh Pham

(57) ABSTRACT

A method for submatch extraction may include receiving an input string, receiving a regular expression, and converting the regular expression with capturing groups into a plurality of finite automata to extract submatches. The method further includes using a first automaton to determine whether the input string is in a language described by the regular expression, and to process the input string, and using states of the first automaton in a second automaton to extract the submatches. In addition, input partitioning and automaton minimization techniques may be employed to reduce the storage area consumed by the plurality of finite automata.

19 Claims, 15 Drawing Sheets

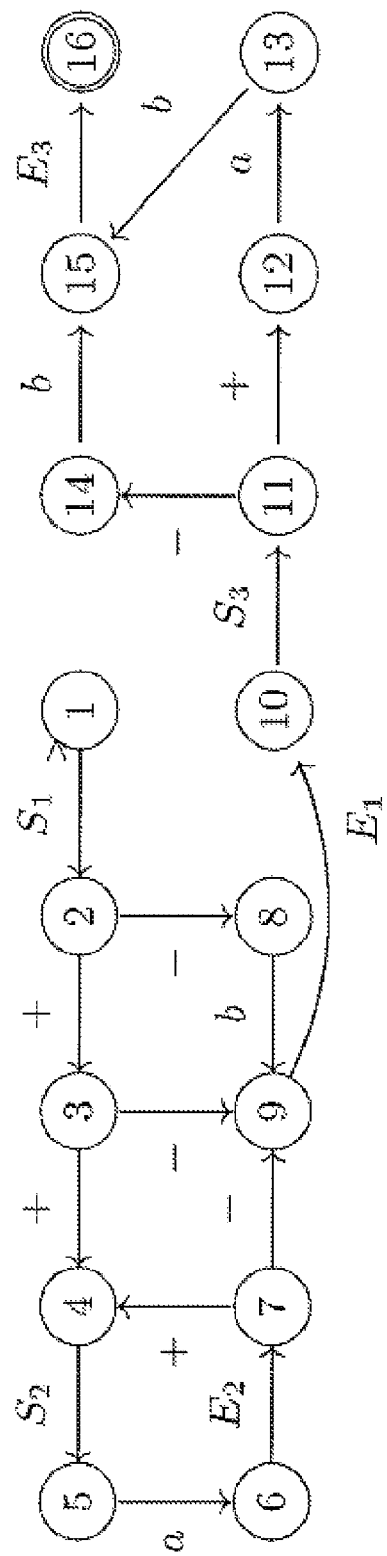
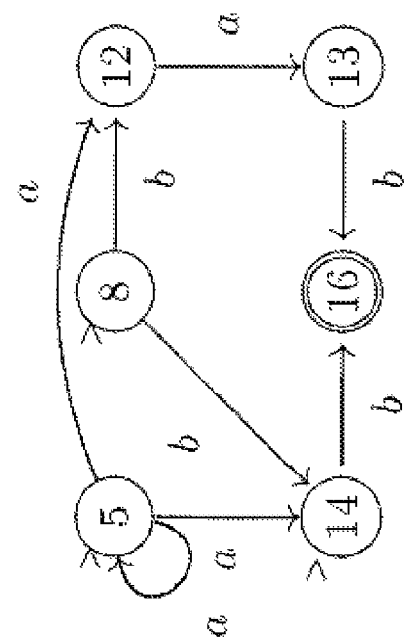
Fig. 4A
Fig. 4B

```
P := {{all accepting states}, {all nonaccepting states}};
T := {{all accepting states}};
while (T is not empty) do
    choose and remove a set A from T
    for each c in Σ do
        let X be the set of states for which a transition
            on c leads to a state in A
        for each set Y in P for which X ∩ Y is nonempty do
            replace Y in P by the two sets X ∩ Y and Y \ X
            if Y is in T
                replace Y in T by the same two sets
            else
                add the smaller of the two sets to T
    end;
end;
end;
```

Fig. 11

```
set newSet[X][Y] to null for all X and Y;
for each s ∈ Q₃ do
    let X be the index of the input partition for s in M₄;
    let Y be 1 if Q₃ is a final state, and 0 otherwise;
    add s to newSet[X][Y];
end;
P := {};
for each non-null value of newSet[X][Y]
    add newSet[X][Y] to P;
end;
```

Fig. 12

```
P := {Q_4};
for each i ∈ Q_3 do
    set newSet[X][Y] to null for all X and Y;
    for each s ∈ Q_4 do
        let X be the index of the partition in P
            containing s;
        let Y be the value τ such that (s,i,q,τ) ∈ Δ_4;
        add s to newSet[X][Y];
    end;
    P := {};
    for each non-null value of newSet[X][Y]
        add newSet[X][Y] to P;
    end;
end;
```

Fig. 13

1400 group a plurality of first state transition entries of the first automaton ($M_3$) into a first automaton input partition if all of the first state transition entries cause the first automaton to transition from a first current state to the same first next state. (1401)

group a plurality of selected states of the first automaton into a second automaton input partition if (1) all of the selected states cause the second automaton ($M_4$) to transition from a second current state to the same second next state and (2) all of the selected states cause the second automaton to output a same tag value. (1402)

group the selected states of the first automaton into a first initial partition if (1) the selected states are either all final states or all non-final states and (2) all the selected states cause the second automaton to generate the same tag value when provided as inputs to the second current state of the second automaton. (1403)

derive, for the first automaton, a first equivalent automaton having a minimum number of states in response to the first initial partition. (1404)

remove certain states from the second automaton input partition to define a second initial partition if the certain states cause the second automaton to generate different tag values when provided as inputs to the second current state of the second automaton. (1405)

derive, for the second automaton, a second equivalent automaton having a minimum number of states in response to the second initial partition. (1406)

Fig. 14

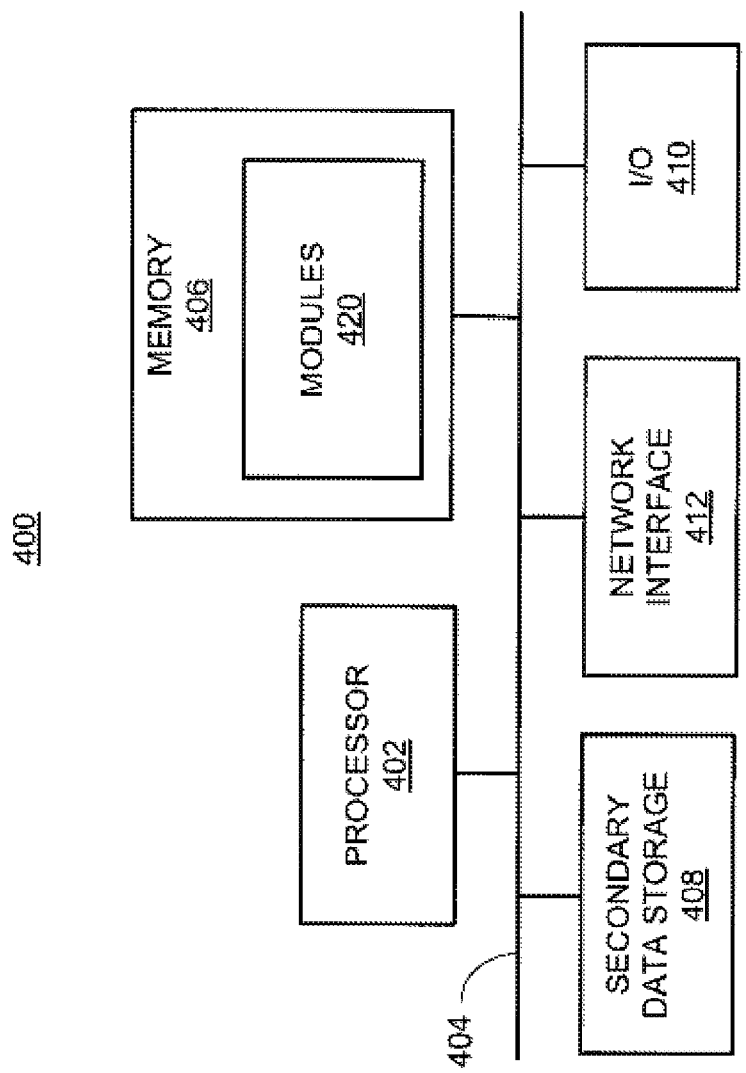

INPUT PARTITIONING AND MINIMIZATION FOR AUTOMATON IMPLEMENTATIONS OF CAPTURING GROUP REGULAR EXPRESSIONS

RELATED FIELD

This disclosure generally relates to the field of content search systems, and specifically relates to regular expression search operations.

BACKGROUND OF RELATED ART

Regular expressions provide a concise and formal way of describing a set of strings over an alphabet. Regular expression search and/or match operations are employed in various applications including, for example, intrusion detection systems (IDS), anti-virus products, policy-based routing functions, internet and text search operations, document comparisons, and so on. A regular expression can simply be a word, a phrase or a string of characters. For example, a regular expression including the string "gauss" would match data containing gauss, gaussian, degauss, etc. More complex regular expressions include metacharacters that provide certain rules for performing the match. Some common metacharacters are the wildcard ".", the alternation symbol "|", and the character class symbol "[ ]." Regular expressions can also include quantifiers such as "*" to match 0 or more times, "+" to match 1 or more times, "?" to match 0 or 1 times, {n} to match exactly n times, {n,} to match at least n times, and {n,m} to match at least n times but no more than m times. For example, the regular expression "a.{2}b" will match any input string that includes the character "a" followed exactly 2 instances of any character followed by the character "b" including, for example, the input strings "abbb," adgb," "a7yb," "aaab," and so on.

Given a regular expression and a string, the regular expression matches the string if the string belongs to the set described by the regular expression. Regular expression matching may be used, for example, by command shells, programming languages, text editors, and search engines to search for text within a document. Known techniques for regular expression matching can have long worst-case matching times. In addition, regular expression matching technique typically consume a significant amount of memory space to store the states and transitions associated with one or more automaton representative of the regular expression.

BRIEF DESCRIPTION OF DRAWINGS

Features of the present disclosure are illustrated by way of example and not limited in the following figure(s), in which like numerals indicate like elements, in which:

FIGS. 4A and 4B respectively illustrate a deterministic finite automaton (DFA) $M_1$ for ((a)*|b)(ab|b), and a nondeterministic finite automaton (NFA) $M_2$ for the same regular expression, according to an example of the present disclosure;

FIG. 11 depicts a pseudo code for implementing Hoperoft's minimization technique;

FIG. 12 depicts a pseudo code for creating initial partitions for application of a DFA minimization technique to the automata $M_3$, according to an example of the present disclosure;

FIG. 13 depicts a pseudo code for creating initial partitions for application of a DFA minimization technique to the automata $M_4$, according to an example of the present disclosure;

FIG. 14 shows an illustrative flow chart depicting an exemplary operation, according to an example of the present disclosure; and FIG. 15 illustrates a computer system, according to an example of the present disclosure.

DETAILED DESCRIPTION

Figure 1:
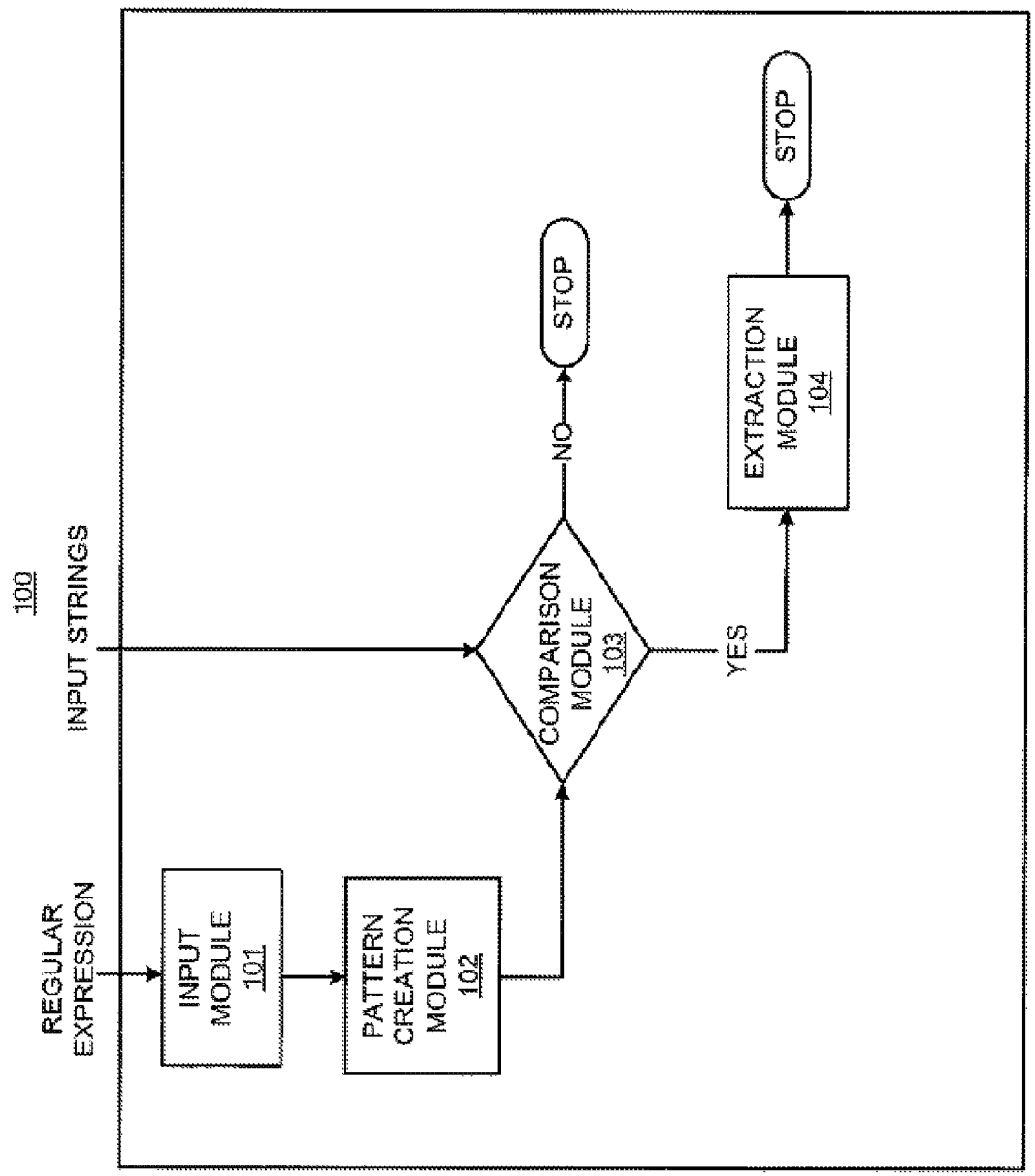
FIG. 1 illustrates an architecture of a submatch extraction system, according to an example of the present disclosure.

The present disclosure is described below in the context of automata for performing regular expression matching operations and regular expression submatch extraction operations for simplicity only. It is to be understood that the present disclosure is equally applicable to automata used for other purposes. In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Throughout the present disclosure, the terms "a" and "an" are intended to denote at least one of a particular element. As used herein, the term "includes" means includes but not limited to, the term "including" means including but not limited to, and the term "based on" means based at least in part on. Further, the terms "accepting states" and "final states" refer to states of an automaton that indicate a match with an input string, and therefore may be interchangeable herein unless otherwise indicated. Similarly, the terms "non-accepting states" and "non-final states" refer to states of an automaton that are intermediate states and that do not result in a match or output value of the automaton, and therefore may be interchangeable herein unless otherwise indicated.

1. Overview

Regular expressions are a formal way to describe a set of strings over an alphabet. Regular expression matching is the process of determining whether a given string (for example, a string of text in a document) matches a given regular expression, that is, whether it is in the set of strings that the regular expression describes. Given a string that matches a regular expression, submatch extraction is a process of extracting substrings corresponding to specified subexpressions known as capturing groups. This feature provides for regular expressions to be used as parsers, where the submatches correspond to parsed substrings of interest. For example, the regular expression (.*)=(.*) may be used to parse key-value pairs, where the parentheses are used to indicate the capturing groups.

A submatch extraction system and a method for extracting submatches from a string that matches a regular expression are described herein. The system and method provide reduced submatch extraction times in the worst case. The submatch extraction system may include an input module to receive a regular expression. The regular expression may be used to create a pattern by a pattern creation module. In order to create the pattern, automata $M_1$, $M_2$, $M_3$ and $M_4$ may be respectively created by automata generation modules. An automaton is defined as an abstract machine that can be in one of a finite number of states and includes rules for traversing the states. The automata may be stored in the system as machine readable instructions. A comparison module may receive input strings, and match the input strings to the regular expression. If an input string does not match the regular expression, submatches are not extracted. However, if an input string matches the regular expression, the pattern created may be used to extract submatches by an output module. In this manner, the regular expression may be compiled by the automata generation modules, and then matched to many different input strings to extract submatches.

In an example, the submatch extraction system may generally include a memory storing a module comprising machine readable instructions to receive an input string, receive a regular expression, and convert the regular expression into a plurality of finite automata to extract submatches. The extracting may include using a first automaton to determine whether the input string is in a language described by the regular expression, and to process the input string, and using states of the first automaton as input to a second automaton to extract the submatches. The system may include a processor to implement the module.

In an example, the method for submatch extraction may include receiving an input string, receiving a regular expression, and converting the regular expression with capturing groups into a plurality of finite automata to extract submatches. The method may further include using a first automaton to determine whether the input string is in a language described by the regular expression, and to process the input string, and using states of the first automaton in a second automaton to extract the submatches.

A non-transitory computer readable medium may have stored thereon machine readable instructions for submatch extraction is also described. The machine readable instructions that when executed may cause a computer system to receive an input string, receive a regular expression, and convert the regular expression into a plurality of finite automata to extract submatches. The extracting includes using a first automaton to determine whether the input string is in a language described by the regular expression, and to process the input string, and using states of the first automaton in a second automaton to extract the submatches.

For regular expressions, the reluctant closure operator, denoted *?, is a variant of the standard greedy closure operator for regular expressions, denoted *, with different submatching behavior. Where other rules do not apply, shorter submatches to a subexpression E*?take priority over longer ones, whereas for E* the reverse is true.

For example, consider matching the string a=b=c first against the regular expression (.*?)=(.*), where the metacharacter '.' matches any character in the alphabet, and then against the regular expression (.*)=(.*?). In the first case, the two capturing groups (which are delimited by parentheses) should match a and b=c, respectively, while in the second case the respective submatches should be a=b and c. If the two capturing groups are both greedy or both reluctant, then matching behavior could in principle be governed by a standard related to precedence, although no suitable standard exists.

With regard to parsing, parsing using regular expressions may be used as a building block for security applications such as security information and event management (SIEM) systems. SIEM systems perform real-time analysis of event logs and security alerts generated by hardware and software systems in an enterprise network. Since each source generates its logs in a different format, a SIEM system may use submatch extraction to parse common fields, such as, for example, device name and attack source from the logs. In such a setting, a relatively small number of regular expressions, which are known in advance, may be matched to a large number of input strings in real time. In this regard, the submatch extraction system and method provide for efficient submatch extraction when matching a string to a regular expression that may contain reluctant operators, where the expression may be compiled in advance into a form that will speed up matching and submatching.

For the example of a submatch extraction system whose construction is described in detail herein, the syntax of regular expressions with capturing groups and reluctant closure on an fixed finite alphabet Σ, for example the standard ASCII set of characters, is:

$$E::=\epsilon\cup a\cup EE\cup E|E\cup E*\cup E*?\cup[E]\cup[E]\qquad\text{Equation (1)}$$

For Equation (1), a stands for an element of Σ, and ε is the empty string. The square brackets [, ] are used to group terms in a regular expression that are not capturing groups. The parentheses (, ) are reserved for marking capturing groups. Grouping terms is not explicitly needed when the order of operations is clear. Specifically, (,) and [,] have a higher priority than * and *?, which have a higher priority than concatenation, which has a higher priority than /. The submatch extraction system may use this syntax. Other examples of the submatch extraction system may perform submatch extraction for regular expressions written in a syntax that uses different notation to denote one or more of the operators introduced in Equation (1); or that does not include either or both of the operators * or *? in Equation (1); or that includes additional operators, such as, for example, special character codes, character classes, boundary matchers, quotation, etc.

Indices may be used to distinguish the capturing groups within a regular expression. Given a regular expression E containing c capturing groups marked by parentheses, indices 1, 2, . . . c may be assigned to each capturing group in the order of their left parentheses as E is read from left to right. The notation idx(E) may be used to refer to the resulting indexed regular expression. For example, if E=((a)*/b)(ab/b) then idx (E)=((a)*$_2$/b)$_1$(ab/b)$_3$.

If X, Y are sets of strings, XY is used to denote $\{xy: x \in X, y \in Y\}$, and X/Y to denote $X \cup Y$. If $\beta$ is a string and B a set of symbols, $\beta/_B$ denotes the string in B* obtained by deleting from $\beta$ all elements that are not in B. A set of symbols $T=\{S_t, E_t: 1 \leq t \leq c\}$ are introduced and may be referred to as tags. The tags may be used to encode the start and end of capturing groups. The language L(F) for an indexed regular expression F=idx(E), where E is a regular expression written in the syntax given by Equation (1), is a subset of $(\Sigma \cup T)^*$, defined by $L(\epsilon)=\{\epsilon\}$, $L(a)=\{a\}$, $L(F_1F_2)=L(F_1)L(F_2)$, $L(F_1/F_2)=L(F_1) \cup L(F_2)$, $L(F^*)=L(F^{*?})=L(F)^*$, $L([F])=L(F)$, and $L((F)_t)=\{S_t \alpha E_t: \alpha \in L(F)\}$, where ()$_t$ denotes a capturing group with index t. There are standard ways to generalize this definition to other commonly-used regular expression operators, so that it can be applied to cases where the regular expression E is written in a commonly-used regular expression syntax different from the syntax given in Equation (1).

A valid assignment of submatches for regular expression E with capturing groups indexed by $\{1, 2, \ldots c\}$ and input string $\alpha$ is a map sub: $\{1, 2, \ldots c\} \rightarrow \Sigma^* \cup \{NULL\}$ such that there exists $\beta \in L(E)$ satisfying the following three conditions:

(i) $\beta/_\Sigma = \alpha$;
(ii) if $S_t$ occurs in $\beta$ then sub(t)=$\beta_t/_\Sigma$, where $\beta_t$ is the substring of $\beta$ between the last occurrence of $S_t$ and the last occurrence of $E_t$; and
(iii) if $S_t$ does not occur in $\beta$ then sub(t)=NULL.

If $\alpha \in \Sigma^*$, $\alpha$ matches E if and only if $\alpha = \beta/_\Sigma$ for some $\beta \in L(E)$. For a regular expression without capturing groups, this coincides with the standard definition of the set of strings matching the expression. By definition, if there is a valid assignment of submatches for E and $\alpha$, then $\alpha$ matches E. It may be proved by structural induction on E that the converse is also true, that is, whenever E matches $\alpha$, there is at least one valid assignment of submatches for E and $\alpha$. The submatch extraction system may take as input a regular expression and an input string, and output a valid assignment of submatches to the capturing groups of the regular expression if there is a valid assignment, or report that the string does not match if there is no valid assignment.

The operators (, ) and [, ] have the same effect as [, ] on the set of strings that match a regular expression. The difference is that (, ) marks a subexpression whose submatch is to be reported. Similarly, the difference between the operators * and *? is not apparent in the set of valid assignments of submatches, but is apparent in which of these valid assignments is reported.

2. System

Figure 2:
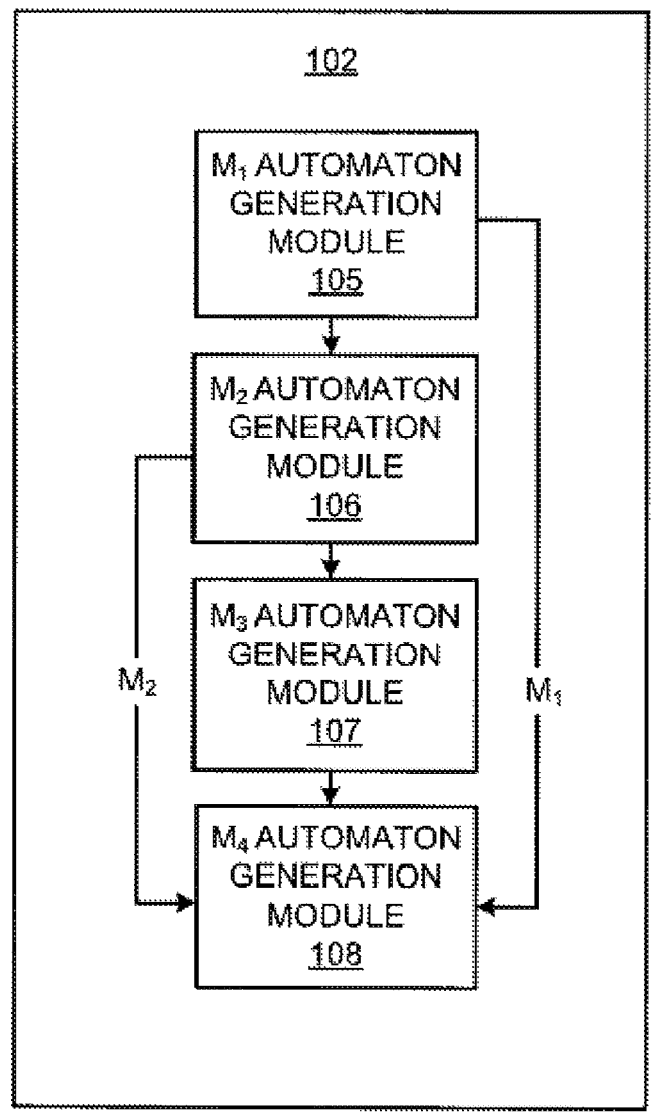
FIG. 2 illustrates an architecture of a pattern creation module of the submatch extraction system, according to an example of the present disclosure.

FIG. 1 illustrates an architecture of a submatch extraction system 100, according to an example. Referring to FIG. 1, the system 100 may include an input module 101 to receive a regular expression. The regular expression may be used to create a pattern by a pattern creation module 102. The pattern creation module 102 is described in further detail below with reference to FIGS. 2 and 10. A comparison module 103 may receive input strings, and match the input strings to the regular expression. If an input string does not match the regular expression, submatches are not extracted. However, if an input string matches the regular expression, the pattern created by the pattern creation module 102 may be used to extract submatches by an extraction module 104. Referring to FIG. 2, in order to create the pattern by the pattern creation module 102, automata $M_1$, $M_2$, $M_3$ and $M_4$ may be respectively created by automata generation modules 105, 106, 107 and 108. Thus, the regular expression may be compiled by the modules 105-108 to create the pattern by the pattern creation module 102. In this manner, the regular expression may be compiled by the modules 105-108, and then matched to many different input strings to extract submatches.

The modules 101-108, and other components of the system 100 may comprise machine readable instructions stored on a computer readable medium. In addition, or alternatively, the modules 101-108, and other components of the system 100 may comprise hardware or a combination of machine readable instructions and hardware.

The components of the system 100 are described in further detail with reference to FIGS. 1-7C.

Referring to FIG. 1, for a regular expression E received by the input module 101, the regular expression E may be fixed and indices may be assigned to each capturing group to form idx(E). In order to create the pattern, the pattern creation module 102 may convert the regular expression E into two deterministic finite automata, denoted $M_3$ and $M_4$. The finite automata $M_3$ and $M_4$ may be used to match a string. For the real-time operation, the input string may be reversed and consumed by the first automaton $M_3$, and the states visited as this happens may be journaled. Once all the symbols in the string have been processed, the journaled states may be used in reverse order as input to the second automaton $M_4$, which is used to determine the start and end locations of each capturing group. These start and end locations may be used by the extraction module 104 to obtain the submatches.

Figure 3:
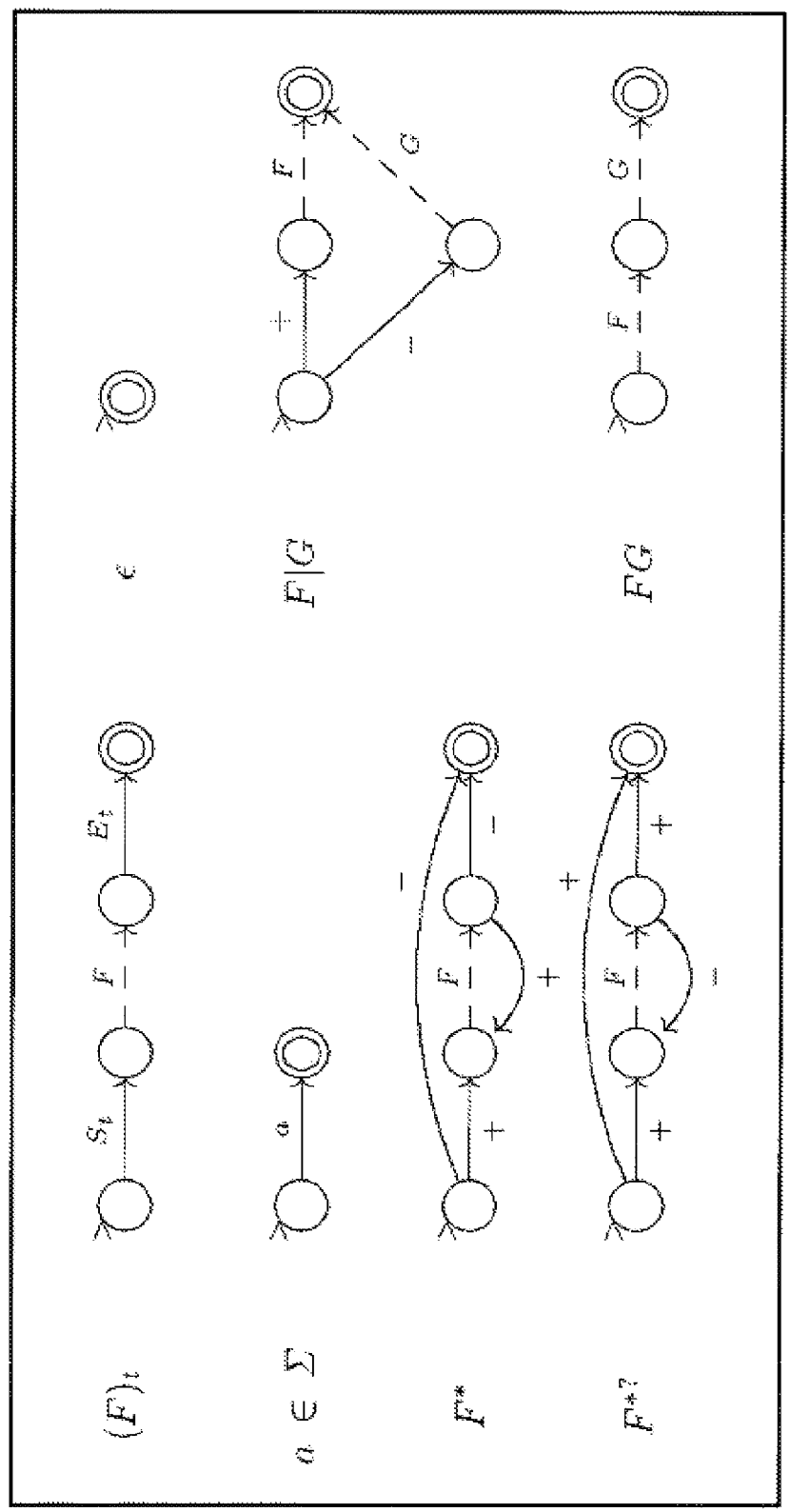
FIG. 3 illustrates rules for the construction of an automaton $M_1$, according to an example of the present disclosure.

In order to create the pattern, the $M_1$ and $M_2$ automata generation modules 105, 106 of the pattern creation module 102 may be used to construct two finite automata, $M_1$ and $M_2$. The automaton $M_1$ is described by the tuple $(Q_1, \Sigma_1, \Delta_1, s_1, f_1)$, where $Q_1$ is a set of states identified by the integers in the set $\{1, 2 \ldots f\}$, $\Sigma_1$ is the alphabet $\Sigma \cup \{+, -\} \cup T$, where + and − are two special alphabet characters whose use is described below, $\Delta_1$ is a transition function, $s_1=1$ is the start state and $f_1=f$ is the unique final state. $\Delta_1$ is built using structural induction on the indexed regular expression, idx(E), following the rules illustrated by the diagrams of FIG. 3. For this example it is assumed that the syntax of the regular expression is that given in Equation (1). In FIG. 3, the initial state of the automaton is marked with > and the final state with a double circle. A dashed arrow with label F or G is used as shorthand for the diagram corresponding to the indexed expression F or G. For example, the automaton $M_1$ for ((a)*/b)(ab/b) is shown in FIG. 4A. The automata of FIGS. 4A, 4B, 5 and 7A-7C are illustrated as a graphical representation of state machines by way of example and not limitation.

The automaton $M_1$ uses separate transitions with labels $S_t$ and $E_t$ to indicate the start and end of a capturing group with index t, in addition to transitions labeled with + and − to indicate submatching priorities.

The automaton $M_1$ may be considered as a directed graph. If x is any directed path in $M_1$, ls(x) denotes its label sequence. Let $\pi: Q_1 \times Q_1 \rightarrow T^*$ be a mapping from a pair of states to a sequence of tags, to be used below in the construction of $M_4$, defined as follows. For any two states q, $p \in Q_1$, consider a depth-first search of the graph of $M_1$, beginning at q and searching for p, using only transitions with labels from $T \cup \{+, -\}$, and such that at any state with outgoing transitions labeled '+' and '−', the search explores all states reachable via the transition labeled '+' before following the transition labeled '−'. If this search succeeds in finding successful search path $\lambda(q, p)$, then $\pi(q, p)=ls(\lambda(q, p))/_T$ is the sequence of tags along this path. If the search fails, then $\pi(q, p)$ is undefined. $\pi(p, p)$ is defined to be the empty string. It can be shown that this description of the search uniquely specifies $\lambda(q, p)$, if it exists.

The automaton $M_1$ may be converted into the nondeterministic finite automaton (NFA) $M_2$, described by the tuple $(Q_2, \Sigma, \Delta_2, S_2, F_2)$, by the $M_2$ automaton generation module 106. The set $Q_2$ includes the final state of $M_1$ together with any state in $M_1$ that has an outgoing transition labeled with a symbol in $\Sigma$, i.e.:

$$Q_2 = \{f\} \cup \{q: \exists a \in \Sigma, p \in Q_1, (q,a,p) \in \Delta_1\} \qquad \text{Equation (2)}$$

If p, $q \in Q_2$ and $a \in \Sigma$, there is a transition $(p, a, q) \in \Delta_2$ if and only if there exists a state $r \in Q_1$ such that $(p, a, r) \in \Delta_1$ and $\pi(r, q)$ is defined. $S_2$ is a set of initial states, corresponding to those states $p \in Q_2$ for which $\pi(1, p)$ is defined. For example, the automaton $M_2$ for $((a)*/b)(ab/b)$ is shown in FIG. 4B.

The automaton $M_2$ may be converted into the deterministic finite automaton (DFA) $M_3$ by the $M_3$ automaton generation module 107, and is specified by the tuple $(Q_3, \Sigma, \Delta_3, s_3, F_3)$. The construction of $M_3$ from $M_2$ is a standard powerset construction of a DFA from a reversed NFA. Specifically, each state in $Q_3$ corresponds to a subset of states in the powerset of $Q_2$. The initial state $s_3$ is $\{f\}$. $Q_3$ is initialized to $\{\{f\}\}$, and states r in $Q_3$ are explored by constructing for each $a \in \Sigma$ the following set:

$$P(r,a) = \{p \in Q_2: (p,a,q) \in \Delta_2 \text{ for some } q \in r\}, \qquad \text{Equation (3)}$$

Figure 5:
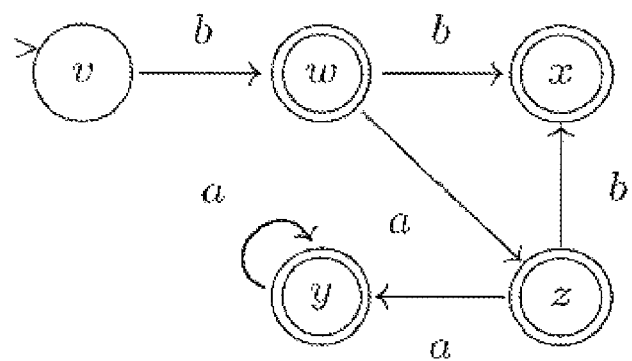
FIG. 5 illustrates an automaton $M_3$ for the regular expression ((a)*|b)(ab|b), where v={16}, w={13, 14}, x={8}, y={5}, and z={5,12}, according to an example of the present disclosure.

Equation (3) represents the set of states from which there is a transition labeled a to an element of r. If this set is not empty, it is added to $Q_3$ and the transition $(r, a, P(r, a))$ is added to $\Delta_3$. Each state in $Q_3$ previously not explored is explored until there are no states in $Q_3$ left to explore. The set of final states in $M_3$, $F_3$, is the set of all states q in $Q_3$ such that $q \cap S_2$ is not empty. As discussed above, FIG. 4B illustrates the automaton $M_2$ for the regular expression $((a)*|b)(ab|b)$. Further, FIG. 5 illustrates the automaton $M_3$ for the same regular expression, where $v=\{16\}$, $w=\{13, 14\}$, $x=\{8\}$, $y=\{5\}$, and $z=\{5,12\}$.

$M_2$ and $M_3$ may be used to construct another automaton, $M_4$ by the $M_4$ automaton generation module 108. The automaton $M_4$ is a DFA except that the transition function is a four-tuple, i.e. $\Delta_4 \subseteq Q_2 \times Q_3 \times Q_2 \times T^*$. The DFA is similar to $M_2$ with one extra state, where the input alphabet is $Q_3$ instead of $\Sigma$, and some edges are deleted. The description of automaton $M_4$ that follows will use some notation concerning $\Sigma_1$ and $M_1$. Let $\prec$ be the lexicographic partial ordering on the set of strings in $\Sigma_1^*$ generated by the relation $\{(-,+)\} \cup \{(a,a): a \in \Sigma_1\}$ on $\Sigma_1$.

Next a new state labeled '0' is introduced, which is the start state of $M_4$. To define $\Delta_4$, let $(q, P, p, \tau)$ be in $\Delta_4$ if and only if there exist q, $r \in Q_2$, $P \in Q_3$, $p \in P$, $a \in \Sigma$, such that $(q, a, r) \in \Delta_1$, $\pi(r, p)$ is defined, and $$\tau = \pi(r, p) = \left( \max_{\prec} \{ls(\lambda(r, p')): p' \in P\} \right)\Big|_T \qquad \text{Equation (4)}$$

Similarly, let $(0, P, p, \tau)$ be in $\Delta_4$ if and only if there exist $P \in Q_3$, $p \in P$ such that $\pi(1, p)$ is defined, and $$\tau = \pi(r, p) = \left( \max_{\prec} \{ls(\lambda(r, p')): p' \in P\} \right)\Big|_T \qquad \text{Equation (5)}$$

It can be proved that these maximal elements exist, and are unique.

Figure 6:
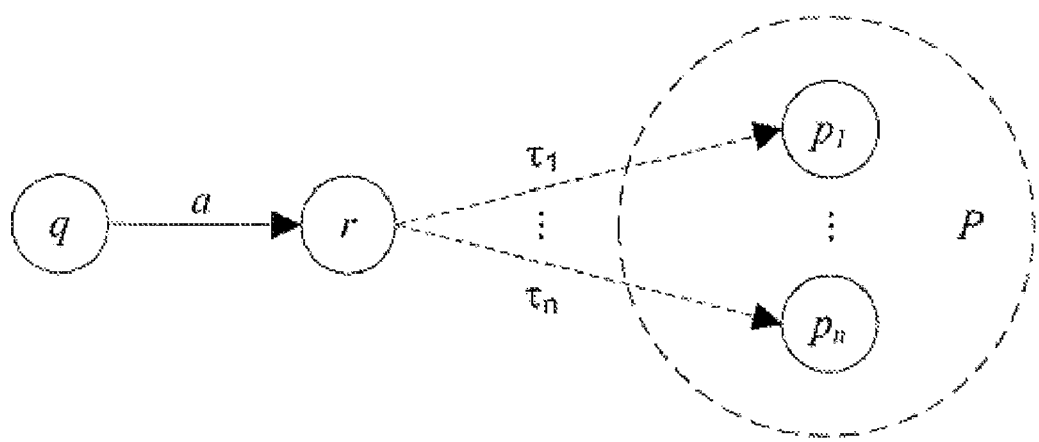
FIG. 6 illustrates relationships among q, r, P, p, and τ in the construction of the automaton $M_4$, according to an example of the present disclosure.
Figure 7A:
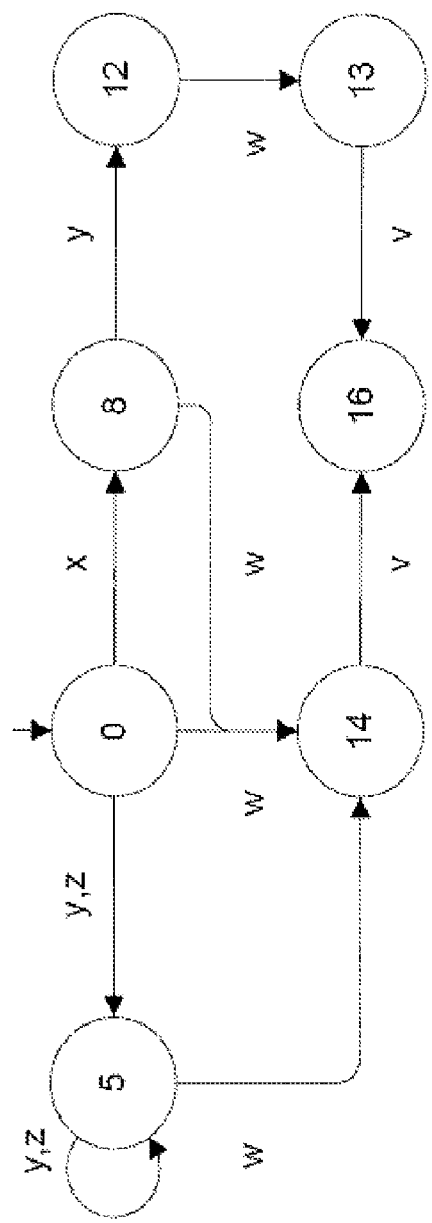
FIGS. 7A and 7B illustrate the automaton $M_4$ for the regular expression ((a)*|b)(ab|b), showing inputs from $Q_3$ and outputs in T*, respectively, and 7C illustrates a simplified diagram of an input string, automata $M_3$ and $M_4$, and boundaries, according to an example of the present disclosure.
Figure 7B:
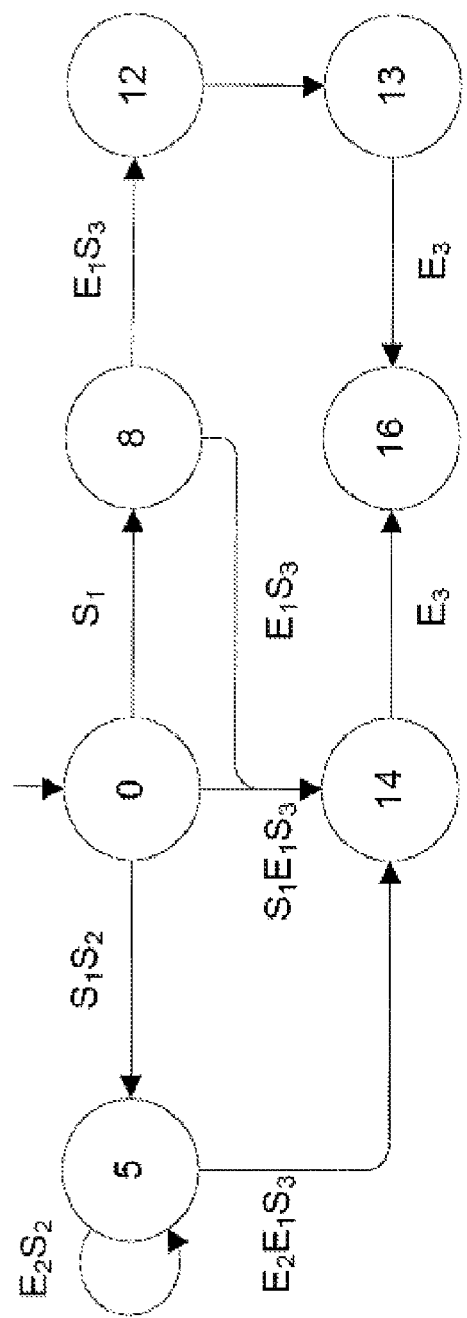
Figure 7C:
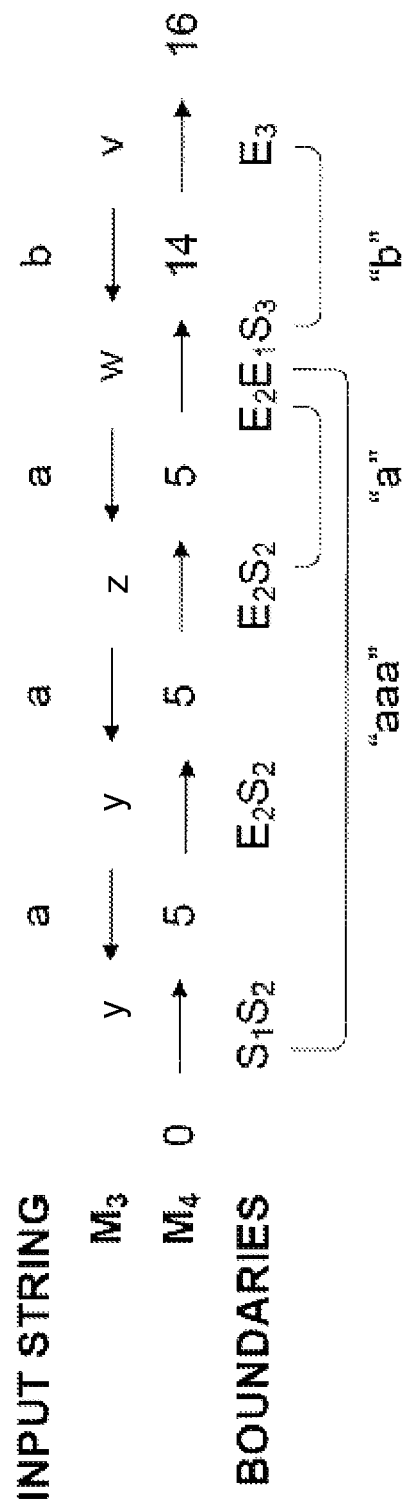

FIG. 6 illustrates the relationships among q, r, P, p, and $\tau$ in the construction of the transition function for $M_4$. Referring to FIG. 6, for the construction of $M_4$, q, r, $p_i \in Q_1$, $P = \{p_1, \ldots, p_n\} \in Q_3$, each path $\lambda(r, p_i)$ has label sequence $\tau_i$, and $\tau = \pi(r, p) = (\max \prec \{\tau_1, \ldots, \tau_n\})/_T$. FIGS. 7A and 7B illustrate the automaton $M_4$ for the regular expression $((a)*/b)(ab/b)$, showing the inputs from $Q_3$ and the outputs in $T^*$, respectively, and FIG. 7C illustrates a simplified diagram of an input string, automata $M_3$ and $M_4$, and boundaries.

As discussed above, if an input string matches the regular expression, the pattern created by the pattern creation module 102 may be used to extract submatches by the extraction module 104 as follows.

Extracting the submatches for a string $a_1 \ldots a_l \in \Sigma^*$ may occur as follows. The extraction process is subdivided in steps 1-3 for facilitating the description of the submatch extraction system 100. First, for step 1, the string $a_l a_{l-1} \ldots a_1$ is processed using $M_3$. As it is processed, the states $q_l, q_{l-1}, \ldots$ visited during the processing are journaled, where $q_l$ is $\{f\}$, the initial state of $M_3$. If the processing terminates before the whole input string has been processed, or terminates with $q_0 \notin F_3$, it is reported that the string does not match, and the submatch extraction terminates. It can be proved that if $M_3$ has been constructed in the way described in the example, this will happen if and only if the string does not match.

Next, for step 2, if the submatch extraction did not terminate in the previous step, the system 100 may run $M_4$ on input $q_0, q_1, \ldots q_l$, using an additional data structure along the way in order to discover the submatch values for each capturing group. The data structure may include an array of length 2c, indexed by elements of T, all initialized to NULL. While processing the $i^{th}$ transition, namely $(q_i, P, q_{i+1}, \tau) \in \Delta_4$, for each tag in $\tau \in T^*$, the system 100 may write i in the array entry corresponding to the tag, overwriting the current entry. It can be proved that if $M_4$ is constructed in the way described in this example, this process will not terminate before all of $q_0, q_1, \ldots q_l$ have been processed by $M_4$.

Next, for step 3, the submatch extraction system 100 uses the resulting array to read off the submatches from the input string, as follows. If the array entries for the tags $S_j$ and $E_j$ are $s_j$ and $e_j$, respectively, then the system reports that the submatch for capturing group j is $a_{s_j+1} \ldots a_{e_j}$. If the array entries for $S_j$ and $E_j$ are NULL, then the system reports that there is no submatch for the $j^{th}$ capturing group. It can be proved that if $M_3$ and $M_4$ are the automata described in the example, then in the case that the array entries for $S_j$ and $E_j$ are NULL, there is indeed no submatch. It can also be proved that if $M_3$ and $M_4$ are the automata described in this example, the assignment of submatches that is reported by the system is valid.

Referring to FIGS. 5 and 7A-7C, an example of processing an input string aaab for the regular expression $((a)*/b)/(ab/b)$ is described. As discussed above, FIG. 5 illustrates the automaton $M_3$ for the regular expression $((a)*|b)(ab|b)$, where the states in FIG. 5 correspond to sets of states in FIG. 4B as follows: $v=\{16\}$, $w=\{13, 14\}$, $x=\{8\}$, $y=\{5\}$, and $z=\{5, 12\}$. Referring to FIG. 5, in step 1, the reversed input string is processed as baaa using $M_3$. As shown in FIG. 5, the processing begins at v, then proceeds from v to w (processing the symbol b), then proceeds from w to z (processing a), then proceeds from z to y (processing another a), then remains at y (processing another a). The states journaled during this processing are v, w, z, y and y, i.e. states {16}, {13,14}, {5,12}, {5}, {5} respectively. These states are then input in reverse order into the automaton $M_4$. Referring to FIG. 7A, the states visited are {16}, {13, 14}, {5, 12}, {5}, {5}, and respectively correspond to v, w, z, y and y. For the processing of these states in this example, referring to FIGS. 7A and 7B the state of $M_4$ is initially 0, then transitions to 5 as a result of receiving the input {5}, giving output $S_1S_2$, then remains at 5 after receiving input {5}, giving output $E_2S_2$, then remains at 5 after receiving input {5,12}, giving output $E_2S_2$, then transitions to 14 as a result of receiving input {13,14}, giving output $E_2E_1S_3$, and transitions to 16 as a result of receiving input {16}, giving output $E_3$. Thus in step 2, the submatch extraction system 100 runs automaton $M_4$ with input ({5}, {5}, {5, 12}, {13, 14}, {16}), writing entries in the array with each transition. The resulting array reads as follows:

$$[S_1, E_1, S_2, E_2, S_3, E_3] = [0, 3, 2, 3, 3, 4] \qquad \text{Equation (7)}$$

In step 3, the extraction module 104 reads from the array that the three capturing groups have respective submatches aaa, a, and b. For example, referring to FIG. 7C, it can be seen that the last instance of each S and each E is kept. The submatches to the capturing groups are read off from the input string aaab using this array, resulting in submatch aaa to capturing group 1, a to capturing group 2 and b to capturing group 3.

3. Method

Figure 8:
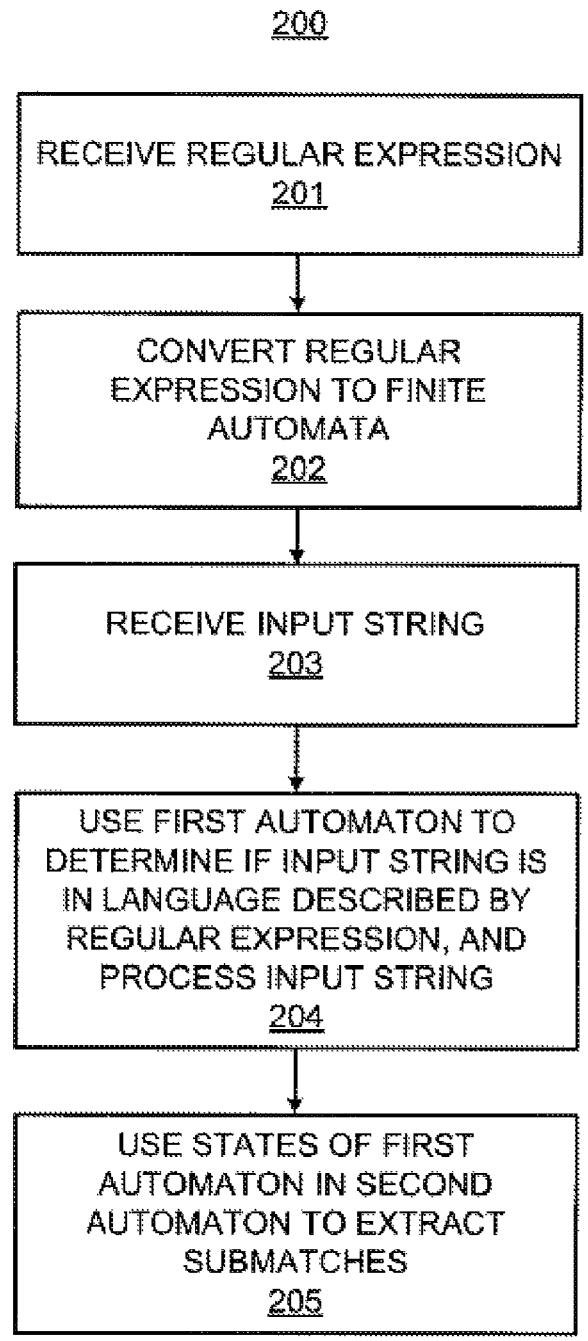
FIG. 8 illustrates a method for submatch extraction, according to an example of the present disclosure.
Figure 9:
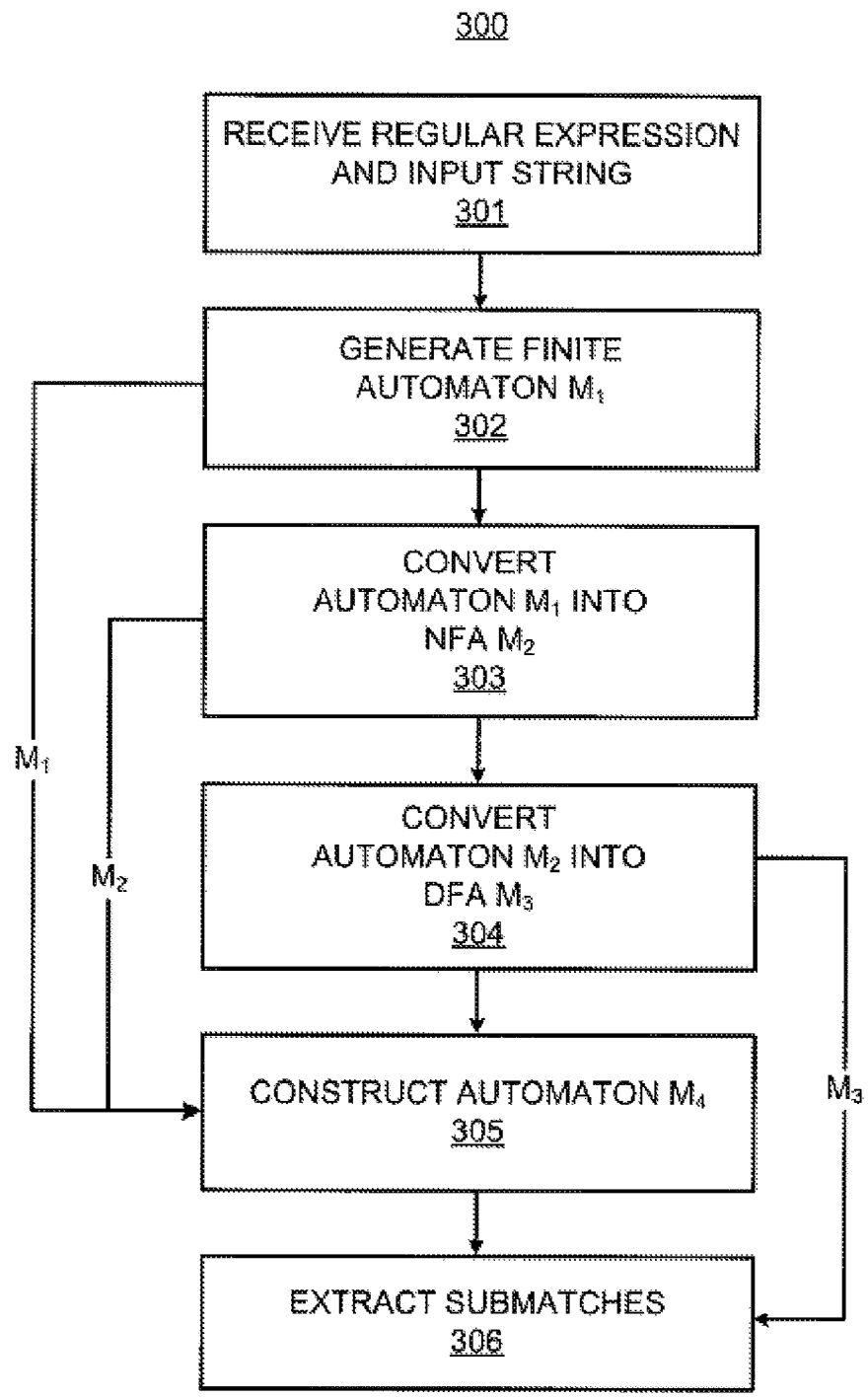
FIG. 9 illustrates a further detailed method for submatch extraction, according to an example of the present disclosure.

FIGS. 8 and 9 illustrate flowcharts of methods 200 and 300 for submatch extraction, corresponding to the example of a submatch extraction system whose construction is described in detail above. The methods 200 and 300 may be implemented on the submatch extraction system with reference to FIGS. 1-7C by way of example and not limitation. The methods 200 and 300 may be practiced in other systems.

Referring to FIG. 8, at block 201, the example method includes receiving a regular expression.

At block 202, the example method includes converting the regular expression with capturing groups into a plurality of finite automata to extract submatches. In this example method, these are the automata $M_1$, $M_2$, $M_3$ and $M_4$ whose construction is described above.

At block 203, the example method includes receiving an input string.

At block 204, the example method includes using a first automaton (i.e., $M_3$) to determine whether the input string is in a language described by the regular expression, and to process the input string.

At block 205, the example method includes using states of the first automaton (i.e., $M_3$) in a second automaton (i.e., $M_4$) to extract the submatches. This includes reversing the input string and processing the reversed input string by the automaton $M_3$, and using the states visited during the processing of the reversed input string in reverse order as input to the automaton $M_4$ to extract the submatches. Indices may be assigned to the capturing groups for the regular expression, the start and end locations of each capturing group may be determined, and the start and end locations may be used to extract the submatches.

Referring to FIG. 9, the further detailed method 300 for submatch extraction is described. At block 301, the example method includes receiving a regular expression and an input string.

At block 302, the example method includes generating the finite automaton $M_1$, whose construction is described above.

At block 303, the example method includes converting the automaton $M_1$ into another automaton, the NFA $M_2$, whose construction is described above.

At block 304, the example method includes converting the automaton $M_2$ into the DFA $M_3$, whose construction is described above.

At block 305, the example method includes using $M_1$, $M_2$ and $M_3$ to construct another automaton, $M_4$, whose construction is described above. Thus, the example method includes converting the regular expression with capturing groups into the automata $M_3$ and $M_4$.

At block 306, the example method includes reversing the input string and processing the reversed input string by the automaton $M_3$, and using the states visited during the processing of the reversed input string in reverse order as input to the automaton $M_4$ to extract the submatches. The method also includes assigning indices to the capturing groups for the regular expression, determining start and end locations of each capturing group, and using the start and end locations to extract the submatches.

As described above, using a plurality of automata to implement regular expression matching operations allows for fast submatch extraction, for example, compared with backtracking algorithms. Unfortunately, automaton-based submatch extraction techniques typically consume a significant amount of storage space, and thus implementation for some applications may be constrained by memory space limitations. In particular, the transition function is typically represented by a two dimensional array, which may be denoted "transitionArray," whose size is the product of the number of states and the number of inputs. In addition, the automaton-based submatch extraction techniques described in this disclosure utilize a second array, which may be denoted "tagArray," to indicate where submatches occur. The size of tagArray is also the product of the number of states and the number of inputs. Thus, in accordance with the present disclosure, the storage space needed to implement the automata described above may be reduced using input partitioning techniques and/or minimization techniques. As described in more detail below, input partitioning techniques described herein may be used to replace a plurality of state transitions having identical behavior with a single state transition (e.g., thereby reducing storage area by eliminating duplicative state transition information), and minimization techniques described herein may be applied to an automaton to find an equivalent automaton that has a fewer number of states (e.g., thereby reducing storage area and increasing processing speeds).

Figure 10:
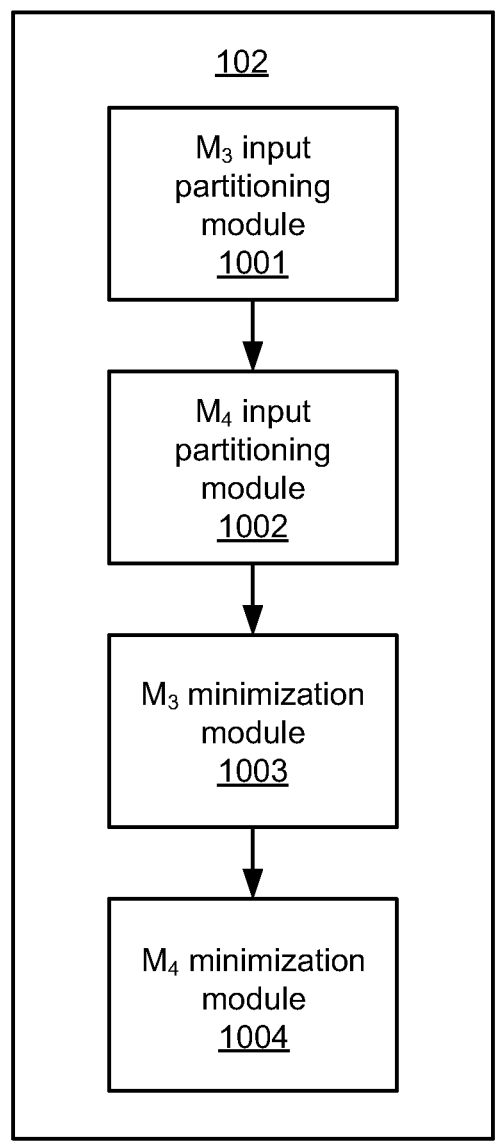
FIG. 10 illustrates an architecture of a pattern creation module of the submatch extraction system, according to another example of the present disclosure.

Referring to FIG. 10, input partitioning and minimization operations may be performed on automata $M_3$ and $M_4$ by input partitioning modules 1001-1002 and by minimization modules 1003-1004, respectively. Modules 1001-1004 may be formed as part of pattern creation module 102 (as depicted in FIG. 10), or by another suitable module within or otherwise associated with system 100 of FIG. 1.

The modules 1001-1004, and other components of the system 100 may comprise machine readable instructions stored on a computer readable medium. In addition, or alternatively, the modules 1001-1004, and other components of the system 100 may comprise hardware or a combination of machine readable instructions and hardware.

4. Input Partitioning

More specifically, for a given automaton, if a group of input values to a state in the automata result in a state transition to the same next state such that the state transition behavior is the same for all such input values, then the group of input values may be mapped to and replaced by a single "coded" value that forms an input partition for the automaton. For example, for the automaton $M_3$, if providing input characters "a" and "b" as inputs to a current state P in $M_3$ always results in a transition to the same next state P' in $M_3$, then the two previously separate state transition entries for input characters "a" and "b" at state P in $M_3$ may be mapped to and replaced by a single state transition entry that embodies the input character group $\{a, b\}$. In this manner, the input characters "a" and "b" form an input partition for $M_3$ that may be stored as a single state transition entry rather than as two separate state transition entries. Similarly, for the automaton $M_4$, if providing journaled states S1 and S2 as inputs to a current state Q in $M_4$ always results in a transition to the same next state Q' in $M_4$, then the two previously separate state transition entries for journaled states 51 and S2 at state Q in $M_4$ may be mapped to and replaced by a single journaled state transition entry that embodies the journaled state group $\{S1, S2\}$. In this manner, the journaled states 51 and S2 form an input partition for $M_4$ that may be stored as a single state transition entry rather than as two separate state transition entries. Accordingly, creating input partitions for automata $M_3$ and $M_4$ may advantageously reduce the number of state transition entries that represent the transition functions for automata $M_3$ and $M_4$, which in turn reduces the amount of storage area consumed by automata $M_3$ and $M_4$.

Accordingly, for the present disclosure, an input partition may be described as a map $\Pi: A \rightarrow B$, where A is the input alphabet (e.g., $\Sigma$ for $M_3$ and $Q_3$ for $M_4$), and B is a set of equivalent character groups or input partitions. Here, the input alphabet may refer to the set of state transitions of the corresponding automaton. Then, the transitions $\Delta_3$ of $M_3$ and the transitions $\Delta_4$ of $M_4$ may be redefined in terms of the equivalent groups B instead of the input alphabet A, thereby mapping the input values to one or more input partitions. Thus, when traversing automata such as $M_3$ and $M_4$, rather than implementing the conventional pseudo code:

State nextState=transitionFunction[currentState][input]

Tags tags=tagFunction[currentState][input], where (currentState; input; nextState; tags)$\in \Delta_4$, a new pseudo code may be implemented as follows:

Partition b=map[input];

State nextState=transitionFunction[currentState][b];

Tags tags=tagFunction[currentState][b].

In this manner, the amount of storage area to represent the arrays "transitionFunction" and "tagFunction" may be significantly reduced.

Because some examples of the present disclosure utilize two inter-dependent deterministic automata $M_3$ and $M_4$ to implement regular expression match operations and submatch extraction operations, respectively (e.g., where $M_3$ is a DFA that processes a reversed input string to find matches, and $M_4$ is a DFA that processes journaled states of $M_3$ to identify the start and end of the input string submatches corresponding to the capturing groups of the regular expression), input partitions are created for one of $M_3/M_4$ to be consistent with the other of $M_3/M_4$ so that the relationship between the inter-dependent automata $M_3$ and $M_4$ remains constant. This makes creating input partitions for $M_3$ and $M_4$ much more difficult that creating input partitions for only one automaton. In other words, because $M_3$ and $M_4$ process different types of input values in different directions (e.g., $M_3$ processes reversed input strings and $M_4$ processes journaled states of $M_3$), only a selected subset of possible input partitions created for $M_3$ may be suitable for $M_4$ and, similarly, only a selected subset of possible input partitions for $M_4$ may be suitable for $M_3$. Thus, it is important to identify the selected subsets of input partitions that may be applied to both $M_3$ and $M_4$ without altering their inter-dependent relationship.

Input Partitioning for $M_3$

Input partitions may be created for the automaton $M_3$ as follows. Two input character state transitions $a_i$ and $a_j$ may be grouped into the same input partition if for every state P in $M_3$ there is another state P' such that when either $a_i$ or $a_j$ is provided as an input value to state P, the automaton $M_3$ transitions to the same next state P'. If true, then the separate state transition entries for $a_i$ and $a_j$ may be mapped to a single state transition entry associated with state P of $M_3$. The input partition creation technique for $M_3$ may be expressed as Statement 1:

$a_i \in \Sigma$ and $a_j \in \Sigma$ are in the same input partition if for all $P \in Q_3$, there exists a $P' \in Q_3$ such that if $(P, a_i, P') \in \Delta_3$ then $(P, a_j, P') \in \Delta_3$.

Input Partitioning for $M_4$

Input partitions may be created for the automaton $M_4$ as follows. Two journaled states $P_i$ and $P_j$ of $M_3$ may be grouped into the same input partition for $M_4$ if for every state q in $M_4$ there is another state q' such that when either $P_i$ or $P_j$ is provided as an input value to state q, the automaton $M_4$ transitions to the same next state q' and outputs the same tag value (t). If true, then the state transition entries for $P_i$ and $P_j$ may be mapped to a partitioned state transition entry associated with state q of $M_4$. The input partition creation technique for $M_4$ may be expressed as Statement 2:

$P_i \in Q_3$ and $P_j \in Q_3$ are in the same input partition if for all $q \in Q_4$, there exists a $q' \in Q_4$ and $t \in T^*$ such that if $(q, P_i, q', t) = \Delta_4$ then $(q, P_j, q', t) = \Delta_4$.

5. Minimization

As mentioned above, it is desirable to minimize the number of states in $M_3$ and $M_4$. This may be accomplished by transforming automata $M_3$ and $M_4$ into respective equivalent automata $M_3'$ and $M_4'$ that have a minimum number of states. Normal minimization algorithms work by creating an initial state partition (not to be confused with the input partitions described above), and then refining that initial state partition recursively, for example, using Hoperoft's algorithm. Normally, that initial state partition corresponds to splitting the states into two sets: those states that are final states and those that are non-final states. In this disclosure, minimization may be performed by applying a standard minimization algorithm to a modified initial state partition created in accordance with the present disclosure. Then, the redefined initial partitions for $M_3$ and $M_4$ may be processed by a suitable DFA minimization technique to derive equivalent automata $M_3'$ and $M_4'$. For example, some applications of the present disclosure may use Hoperoft's algorithm to process the redefined initial partitions of $M_3$ and $M_4$ to derive equivalent DFAs having fewer numbers of states, thereby reducing the memory area for storing the two arrays "transitionFunction" and "tagFunction" associated with the pseudo code described above with respect to creating input partitions. Of course, for other applications, other suitable DFA minimization techniques may be used to derive equivalent automata $M_3'$ and $M_4'$.

Minimizing $M_3$

For the automaton $M_3$, two states in $M_3$ may be grouped together in the same redefined initial partition if (1) both states are either non-final states or final states and (2) both states generate the same tag outputs when provided as journaled state entries to a given state q in $M_4$. This may be expressed as Statement 3:

Let states $P_i \in Q_3$ and $P_j \in Q_3$ be in the same initial state partition if (1) $P_i$ and $P_j$ are both in F or $P_i$ and $P_j$ are both not in F and (2) $P_i$ and $P_j$ are in the same input partition of $M_4$.

FIG. 12 depicts a pseudo code 1200 that may be employed to create the redefined initial partitions for $M_3$. Thus, to create the redefined initial partitions for $M_3$, the states in $M_3$ are grouped according to whether they are final (e.g., accepting) states or non-final (e.g., non-accepting) states and also according to whether the states are in the same journaled state groups in $M_4$. In other words, each redefined initial partition of $M_3$ includes only states that (1) are either all final states or all non-final states and (2) belong to the same journaled state partition of $M_4$.

For example, if $M_3$ has five states S1-S5 for which states S1-S3 are grouped into a first input partition Z1 and states S4-S5 are grouped into a second input partition Z2 using Statement 1, and if states S1-S2 are both non-final states and S3 is a final state, then the first input partition Z1 is divided into two separate initial partitions Z1a containing states S1-S2 and Z1b containing state S3, for example, as may be implemented by the pseudo code 1200 of FIG. 12.

Thereafter, the redefined initial partitions created using the pseudo code 1200 of FIG. 12 may be processed by Hoperoft's algorithm (or any other suitable DFA minimization algorithm) to find an equivalent DFA $M_3'$ having a fewer number of states than original DFA $M_3$.

Minimizing $M_4$

For the automaton $M_4$, which does not have final and non-final states but rather has states that either output tag values or don't output tag values, two states may not be grouped in the same input partition if there is at least one input value that results in $M_4$ outputting different tag values. In other words, if the two states produce different output tags in response to the same journaled state input value, then the two states cannot be in the same input partition. Otherwise, grouping these two states together in the same partition may undesirably result in $M_4$ becoming a non-deterministic automaton. This may be expressed as Statement 4:

Let states $q_i \epsilon Q_4$ and $q_j \epsilon Q4$ be in in different partitions if for all $P \epsilon Q_3$, there exist distinct $t_i \epsilon T^*$ and $t_j \epsilon T^*$ such that there exists at least two relations $(q_i, P, q', \tau_i) \epsilon \Delta_4$ and $(q_j, P, q', \tau_j)$ for some $q_i' \epsilon Q_3$ and $q_j' \epsilon Q_3$.

Thus, to define the initial partitions of $M_4$, the technique begins with the input partition being the entire set of states $Q_4$. Then for each input, $i \epsilon Q_3$, a partition of the states is derived based on their tag strings. This is possible because there is only one relation $(q, i, q', \tau)$ for a given state q and input i. Using Statement 4, the input partition may be iteratively refined to derive the initial partitions for $M_4$, for example, using the pseudo code 1300 shown in FIG. 13. Thereafter, the initial partitions created according to the pseudo code 1300 of FIG. 13 may be processed by Hoperoft's algorithm (or any other suitable DFA minimization algorithm) to find an equivalent DFA $M_4'$ having a fewer number of states than $M_4$.

Note that the initial partitions may be created by comparing every pair of states and then sequentially assigning them to the next available partition if they are in conflict. However, such an approach would require a processing time of $O(n^2)$ for n states, and would thus undermine the efficiencies of Hoperoft's algorithm over other quadratic time minimization algorithms. Thus, to make the minimization technique asymptotically efficient, the following observation may be made. Suppose there are two partitions $\pi_1$ and $\pi_2$ of the set of states $Q_4$. Let $\phi_i(q)$ be the index of the set in $\pi_i$ that contains state q. Then, the intersection of $\pi_1$ and $\pi_2$ is a new partition $\pi_{12}$ such that any two states $q_1$ and $q_2$ are in the same set of $\pi_{12}$ if and only if they have the same values for $\phi_1$ and $\phi_2$.

For other embodiments, a one-pass automaton may be used to process an input string to find matches with certain regular expressions. The one-pass automaton may be defined by the tuple $(Q, \Sigma, \Delta, q_0, F)$, where Q is some set of states, $\Sigma$ is an alphabet of input symbols, $\Delta$ is a set of relations in $Q \times \Sigma \times \Delta \times T$ called the transition function, $q_0 \epsilon Q_3$ is an initial state, and $F \subseteq Q$ is a set of accepting states. For such automata, the pseudo code 1300 of FIG. 13 may be applied to create the input partition, except that instead of starting with the entire set of states as the initial partition (e.g., P:={Q}), we start with states partitioned into accepting states and non-accepting states, where P:={{F}, {Q-F}}.

FIG. 14 is a illustrative flow chart depicting an exemplary operation for creating input partitions for $M_3$ and $M_4$ and for minimization the number of states in $M_3$ and $M_4$. As mentioned above, the automaton $M_3$ determines whether the input string matches the regular expression by processing characters of the input string in a reversed order, and the automaton $M_4$ determines boundaries of the submatches by processing states transitioned by the first automaton in a reversed order. To create input partitions for and to minimize $M_3$ and $M_4$, a plurality of first state transition entries of the $M_3$ are grouped into an $M_3$ input partition if all of the first state transition entries cause $M_3$ to transition from a first current state to the same first next state (1401). Then, a plurality of selected states of $M_3$ are grouped into an $M_4$ input partition if (1) all of the selected states cause $M_4$ to transition from a second current state to the same second next state and (2) all of the selected states cause $M_4$ to output the same tag value, wherein the tag value indicates a start and an end of a corresponding extracted submatch (1402).

Next, to minimize $M_3$, the selected states of $M_3$ are grouped into a first initial partition if (1) the selected states are either all final states or all non-final states and (2) all the selected states cause $M_4$ to generate the same tag value when provided as inputs to the second current state of $M_4$ (1403). Then, in response to the first initial partition, a first equivalent automaton $M_3'$ is derived for $M_3$ such that $M_3'$ has a minimum number of states (1404).

Next, to minimize $M_4$, certain states are removed from the $M_4$ input partition to define an $M_4$ initial partition if the certain states cause $M_4$ to generate different tag values when provided as inputs to the second current state of $M_4$ (1405). Then, in response to the second initial partition, a second equivalent automaton $M_4'$ is derived for $M_4$ such that $M_4'$ has a minimum number of states (1406).

6. Computer Readable Medium

FIG. 15 shows a computer system 400 that may be used with the examples described herein. The computer system 400 represents a generic platform that includes components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include modules 420 including machine readable instructions residing in the memory 406 during runtime and executed by the processor 402. The modules 420 may include the modules 101-108 of the system 100 shown in FIG. 1 and/or modules 1001-1004 of FIG. 10.

The computer system 400 may include an I/O device 410, such as a keyboard, a mouse, a display, etc. The computer system 400 may include a network interface 412 for connecting to a network. Other known electronic components may be added or substituted in the computer system 400.

In the foregoing specification, the present disclosure has been described with reference to specific examples. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. For example, method steps depicted in the flow charts of FIGS. 8-9 and 14 may be performed in other suitable orders and/or one or more methods steps may be omitted.

What is claimed is:

1. In a system including a first automaton for finding a match between an input string and a regular expression and including a second automaton for extracting submatches corresponding to capturing groups in the regular expression, a method for creating input partitions for the first and second automata, the method comprising:
   grouping a plurality of first state transition entries of the first automaton into a first automaton input partition when all of the first state transition entries cause the first automaton to transition from a first current state to the same first next state; and
   grouping a plurality of selected states of the first automaton into a second automaton input partition when (1) all of the selected states cause the second automaton to transition from a second current state to the same second next state and (2) all of the selected states cause the second automaton to output a same tag value, wherein the tag value indicates a start and an end of a corresponding extracted submatch.

2. The method of claim 1, wherein:
   the first automaton determines whether the input string matches the regular expression by processing characters of the input string in a reversed order; and
   the second automaton determines boundaries of the submatches by processing states transitioned by the first automaton in a reversed order.

3. The method of claim 1, wherein the first automaton transitions from the first current state to the first next state in response to a transition function defined by the first current state and the first automaton input partition.

4. The method of claim 1, wherein the second automaton transitions from the second current state to the second next state in response to a transition function defined by the second current state and the second automaton input partition.

5. The method of claim 1, further comprising:
   grouping the plurality of selected states of the first automaton into a first initial partition when (1) the selected states are either all final states or all non-final states and (2) all the selected states cause the second automaton to generate the same tag value when provided as inputs to the second current state of the second automaton; and
   deriving, for the first automaton, a first equivalent automaton having a minimum number of states in response to grouping the plurality of selected states of the first automation into the first initial partition.

6. The method of claim 1, further comprising:
   removing certain states from the second automaton input partition to define a second initial partition when the certain states cause the second automaton to generate different tag values when provided as inputs to the second current state of the second automaton; and
   deriving, for the second automaton, a second equivalent automaton having a minimum number of states in response to defining the second initial partition.

7. The method of claim 1, wherein the plurality of first state transition entries represent a set of input values included in the input string, and wherein the first automaton input partition is defined by a single coded value representing the set of input values of the first automaton.

8. A system for creating input partitions for first and second automata, wherein the first automaton is to find a match between an input string and a regular expression and the second automaton is to extract submatches corresponding to capturing groups in the regular expression, the system comprising:
   means for grouping a plurality of first state transition entries of the first automaton into a first automaton input partition when all of the first state transition entries cause the first automaton to transition from a first current state to the same first next state; and
   means for grouping a plurality of selected states of the first automaton into a second automaton input partition when (1) when all of the selected states cause the second automaton to transition from a second current state to the same second next state and (2) all of the selected states cause the second automaton to output a same tag value, wherein the tag value indicates a start and an end of a corresponding extracted submatch.

9. The system of claim 8, wherein:
   the first automaton determines whether the input string matches the regular expression by processing characters of the input string in a reversed order; and
   the second automaton determines boundaries of the submatches by processing states transitioned by the first automaton in a reversed order.

10. The system of claim 8, wherein the first automaton is to transition from the first current state to the first next state in response to a transition function defined by the first current state and the first automaton input partition.

11. The system of claim 8, wherein the second automaton is to transition from the second current state to the second next state in response to a transition function defined by the second current state and the second automaton input partition.

12. The system of claim 8, further comprising:
   means for grouping the selected states of the first automaton into a first initial partition when (1) the selected states are either all final states or all non-final states and (2) all the selected states cause the second automaton to generate the same tag value when provided as inputs to the second current state of the second automaton; and
   means for deriving, for the first automaton, a first equivalent automaton having a minimum number of states in response to the first initial partition.

13. The system of claim 8, further comprising:
   means for removing certain states from the second automaton input partition to define a second initial partition when the certain states cause the second automaton to generate different tag values when provided as inputs to the second current state of the second automaton; and means for deriving, for the second automaton, a second equivalent automaton having a minimum number of states in response to the second initial partition.

14. The system of claim 8, wherein the plurality of first state transition entries represent a set of input values included in the input string, and wherein the first automaton input partition is defined by a single coded value representing the set of input values of the first automaton.

15. A system for creating input partitions for first and second automata, wherein the first automaton is to find a match between an input string and a regular expression and the second automaton is to extract submatches corresponding to capturing groups in the regular expression, the system comprising:

a processor; and a memory coupled to the processor and having stored therein computer-executable instructions that when executed by the processor cause the system to:

group a plurality of first state transition entries of the first automaton into a first automaton input partition if all of the first state transition entries cause the first automaton to transition from a first current state to the same first next state; and group a plurality of selected states of the first automaton into a second automaton input partition if (1) all of the selected states cause the second automaton to transition from a second current state to the same second next state and (2) all of the selected states cause the second automaton to output a same tag value, wherein the tag value indicates a start and an end of a corresponding extracted submatch.

16. The system of claim 15, wherein:

the first automaton determines whether the input string matches the regular expression by processing characters of the input string in a reversed order; and the second automaton determines boundaries of the submatches by processing states transitioned by the first automaton in a reversed order.

17. The system of claim 15, wherein the instructions, when executed by the processor, further cause the system to:

group the selected states of the first automaton into a first initial partition if (1) the selected states are either all final states or all non-final states and (2) all the selected states cause the second automaton to generate the same tag value when provided as inputs to the second current state of the second automaton; and derive, for the first automaton, a first equivalent automaton having a minimum number of states in response to the first initial partition.

18. The system of claim 15, wherein the instructions, when executed by the processor, further cause the system to:

remove certain states from the second automaton input partition to define a second initial partition if the certain states cause the second automaton to generate different tag values when provided as inputs to the second current state of the second automaton; and derive, for the second automaton, a second equivalent automaton having a minimum number of states in response to the second initial partition.

19. The system of claim 15, wherein the plurality of first state transition entries represent a set of input values included in the input string, and wherein the first automaton input partition is defined by a single coded value representing the set of input values of the first automaton.

* * * * *

UNITED STATES PATENT AND TRADEMARK OFFICE
CERTIFICATE OF CORRECTION

| | | |
|---|---|---|
| PATENT NO. | : 8,793,251 B2 | Page 1 of 1 |
| APPLICATION NO. | : 13/562728 | |
| DATED | : July 29, 2014 | |
| INVENTOR(S) | : William G Horne et al. | |

It is certified that error appears in the above-identified patent and that said Letters Patent is hereby corrected as shown below:

In the specification

In column 2, lines 21 and 22, delete "Hoper- oft's" and insert -- Hopcroft's --, therefor.

In column 4, line 21, delete "E*?take" and insert -- E*? take --, therefor.

In column 8, line 43, delete "$g_0$," and insert -- $q_0$, --, therefor.

In column 11, line 11, delete "51" and insert -- S1 --, therefor.

In column 11, line 14, delete "51" and insert -- S1 --, therefor.

In column 12, line 37, delete "Hoperoft's" and insert -- Hopcroft's --, therefor.

In column 12, line 47, delete "Hoperoft's" and insert -- Hopcroft's --, therefor.

In column 13, line 13, delete "Hoperoft's" and insert -- Hopcroft's --, therefor.

In column 13, line 47, delete "Hoperoft's" and insert -- Hopcroft's --, therefor.

In column 13, line 55, delete "Hoperoft's" and insert -- Hopcroft's --, therefor.

In the claims

In column 16, line 33, in Claim 8, delete "(1) when" and insert -- (1) --, therefor.

Signed and Sealed this
Twelfth Day of April, 2016

Michelle K. Lee
*Director of the United States Patent and Trademark Office*